United States Patent [19]

Kawahara et al.

[11] Patent Number: 5,213,489
[45] Date of Patent: May 25, 1993

[54] SCROLL COMPRESSOR WITH AXIAL VIBRATION PREVENTION FOR A SHAFT BEARING

[75] Inventors: Sadao Kawahara, Otsushi; Michio Yamamura, Kusatsushi; Jiro Yuda, Ikomashi; Yoshinori Kojima, Kusatsushi; Shuichi Yamamoto, Otsushi; Manabu Sakai, Toyonakashi; Shigeru Muramatsu; Osamu Aiba, both of Kusatsushi, all of Japan

[73] Assignee: Matsushita Electric Industrial Co., Ltd., Osaka, Japan

[21] Appl. No.: 688,556

[22] PCT Filed: Nov. 2, 1990

[86] PCT No.: PCT/JP90/01424
§ 371 Date: Sep. 3, 1991
§ 102(e) Date: Sep. 3, 1991

[87] PCT Pub. No.: WO91/06776
PCT Pub. Date: May 16, 1991

[30] Foreign Application Priority Data
Nov. 2, 1989 [JP] Japan ................. 1-287022

[51] Int. Cl.$^5$ .................. F04C 18/04; F04C 29/00; F16C 27/06; H02K 5/24
[52] U.S. Cl. .................. 418/55.1; 417/410 D; 310/51; 384/517
[58] Field of Search .................. 418/55.1, 55.6; 417/410, 410 D; 384/517, 518, 563; 310/51

[56] References Cited
U.S. PATENT DOCUMENTS
4,655,616  4/1987  Duncan .................. 384/517

FOREIGN PATENT DOCUMENTS
58-172485  10/1983  Japan .
58-196320  11/1983  Japan .................. 384/517
62-253982  11/1987  Japan .
1170779    7/1989   Japan .
1177482    7/1989   Japan .

Primary Examiner—John J. Vrablik
Attorney, Agent, or Firm—Stevens, Davis, Miller & Mosher

[57] ABSTRACT

In a scroll-type compressor, the revolving motion drive shaft 16, formed on the revolving end plate 12 at the side opposite to the revolving swirl blades 11, is fitted in an eccentric bearing eccentrically disposed inside of the main shaft of the crank shaft 6. The crank shaft 6 is connected to the rotor of the electric motor and is supported at the end portion thereof opposite to the main shaft by an upper bearing of a rolling type. Above the upper bearing, a rise preventing plate 24 for preventing the crank shaft 6 from excessively rising upwards is arranged in a fixed manner. The crank shaft 6 is so shaped as to have a stepped portion where the diameter of the shaft portion mounting the rotor 5 becomes stepwise greater than that of the shaft portion fitted in the upper bearing 21. Between the stepped portion and the inner race of the upper bearing 21 is provided an elastic member 26 which can be wave shaped. Between the rise preventing plate 24 and the end portion of the crank shaft 6 opposite to the main shaft of the crank shaft 6 a narrow clearance is maintained. By applying an elastic force of the elastic member 26 on the inner race of the upper bearing in the axial direction, abnormal noises from the bearing caused by axial vibrations and resonances of the shaft system can be prevented.

2 Claims, 5 Drawing Sheets

SCROLL COMPRESSOR WITH AXIAL VIBRATION PREVENTION FOR A SHAFT BEARING

TECHNICAL FIELD

The present invention relates to a motor-driven compressor of a scroll type used as a refrigerant compressor or an air compressor for refrigeration or air conditioning.

BACKGROUND ART

In the past, in a compressor of this type, as shown in FIGS. 1 and 2, a stator 104 of a motor 103 for driving a compression mechanism 102 is fixed to the inside of a closed container 101; a crank shaft 106 for driving the compression mechanism 102 is connected with a rotor 105 of the motor 103; and a lubricant oil sump 107 is formed in the lower portion of the closed container 101. The compression mechanism 102 comprises a stationary swirl vane member 110 integrally composed of a stationary frame body 108 and stationary swirl vanes 109, a revolving swirl blade member 113 integrally composed of revolving swirl blades 111 for defining a plurality of compression work rooms 114 as meshing with the stationary swirl vanes 109 and a revolving end plate 112 mounting thereon the revolving swirl blades 111, and a rotation preventing member 115 preventing the rotation of the revolving swirl blade member 113 on its own axis, but only allowing a revolving motion of the same. The revolving end plate 112 is formed at the side opposite to the revolving swirl blades 111 with a revolving motion drive shaft 116, which is fitted in an eccentric bearing 118 eccentrically disposed inside of a main shaft 117 which is formed at one end of the crank shaft 106. This crank shaft 106 is supported by a main bearing member 120, which accommodates a main bearing 119 supporting the main shaft 117, and by an upper bearing member 122, which mounts a plain bearing 121 supporting the crank shaft 106 at the end position thereof opposite to the main shaft. A thrust bearing 123 fixed to the above-mentioned main bearing member 120 supports the revolving end plate 112 in the axial direction. The refrigerant gas suctioned through the suction tube 124 of the compressor flows from an inlet port 125 of the compression mechanism 102 to the compression mechanism, compressed in a compression work room 114, and discharged from an outlet port 126 through a discharge room 127 and an outlet tube 128 to the outside of the compressor. (JP-A-1-177482).

In the above mentioned compressor of a prior art, since the crank shaft 106 holding the rotor 105 is supported at the both ends thereof, the main shaft 117 receives substantially no bending moment, and the bending moment acting on the crank shaft 106 is also small, thereby enhancing the reliability of the compressor. However, the rotary shaft portion of the crank shaft 106 is apt to suffer a galling force in assembling processes, which may generate a vibration of the compressor or a damage of the bearing. Further, the lubrication for the upper bearing 121 is apt to become insufficient, thereby possibly causing damage of a bearing when a plain bearing is used. FIG. 2 shows a solution for the above-mentioned problem. In this drawing, the end portion of the crank shaft 201 opposite to the main shaft 202 is supported by an upper rolling bearing 203. A rolling bearing has an advantage, in comparison with a plain bearing, of being able to bear a radial load and an axial load at the same time, and requiring little lubricant oil for lubrication of the bearing. As a result, the precision in assembling and the control of the oil lubrication is not required to be so strict. (JP-A-1-170779, JP-A-58-172485, JP-A-62-253982). A rolling bearing has, however, a severe problem of generating vibration and noise caused by axial vibration and resonance of the bearing.

DISCLOSURE OF THE INVENTION

In view of the above-mentioned problem, the object of the invention is to improve the vibration and noise characteristics of the compressor and to provide a scroll type compressor having a high reliability which can prevent damage of the upper plain bearing caused by falling or during transporting of the compressor.

In concrete terms, as the first solving means, at an upper position of the interior of a closed container is disposed an electric motor, while at a lower position is disposed a compression mechanism driven by the motor. The compression mechanism comprises a stationary swirl vane member including a stationary frame body formed with stationary swirl vanes thereon, a revolving swirl blade member including revolving swirl blades for defining a plurality of compression work rooms in co-operation with the stationary swirl vanes as meshing with the swirl blades and a revolving end plate mounting thereon the revolving swirl blades, and a rotation preventing member preventing the rotation of the revolving swirl blade member on its own axis but only allowing a revolving motion of the same. A main shaft formed at one end of a crank shaft giving a revolving motion to the above-mentioned revolving swirl blade member is supported by a main bearing, and a revolving motion shaft formed on the side of the revolving end plate opposite to the revolving swirl blades is fitted in an eccentric bearing eccentrically disposed inside of the main shaft of the crank shaft. The crank shaft is connected to the rotor of the motor, and the end portion of the crank shaft opposite to the main shaft is supported by an upper bearing of rolling type. Above the upper bearing is provided a rise preventing plate for preventing the crank shaft from excessively rising upward. The crank shaft is so shaped as to have a stepped portion where the diameter of a shaft portion mounting the rotor becomes stepwise greater than that of the other shaft portion fitted in the upper bearing. Between the stepped portion and an inner race of the upper bearing is provided an elastic member, and between the rise preventing plate and the end surface of the crank shaft opposite to the main shaft is formed a narrow clearance.

As the second solving means, according to the present invention, in addition to the first solving means, the amount of the initial clearance between the rise preventing plate and the end surface of the crank shaft opposite to the main shaft is so determined as to be smaller than an elastic deformation amount assumed when the elastic member is acted on by a force equivalent to the limit load of the upper bearing.

BEST MODE FOR CARRYING OUT THE INVENTION

Figure 1:
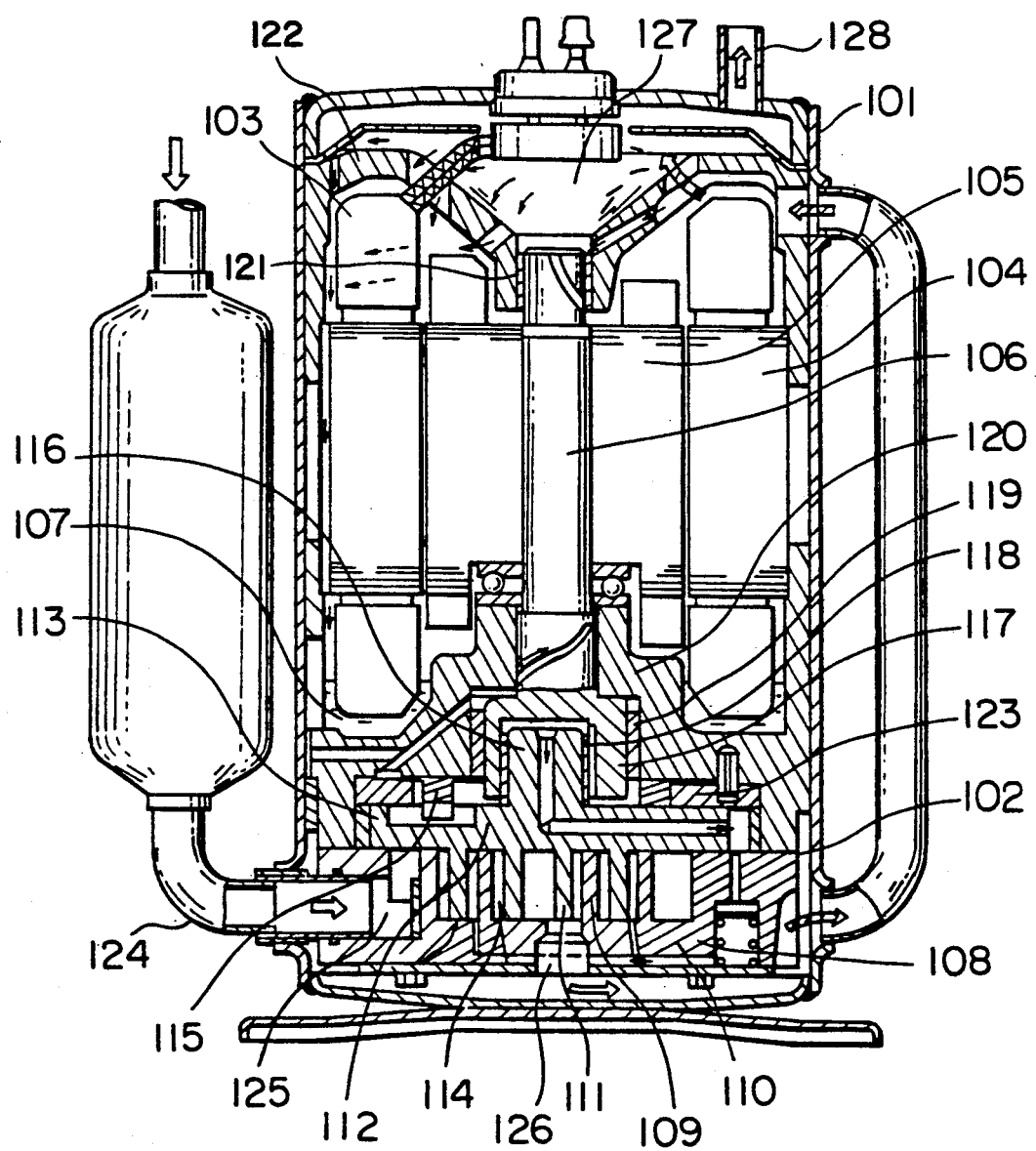
FIGS. 1 and 2 are sectional views of scroll conventional compressors respectively.
Figure 2:
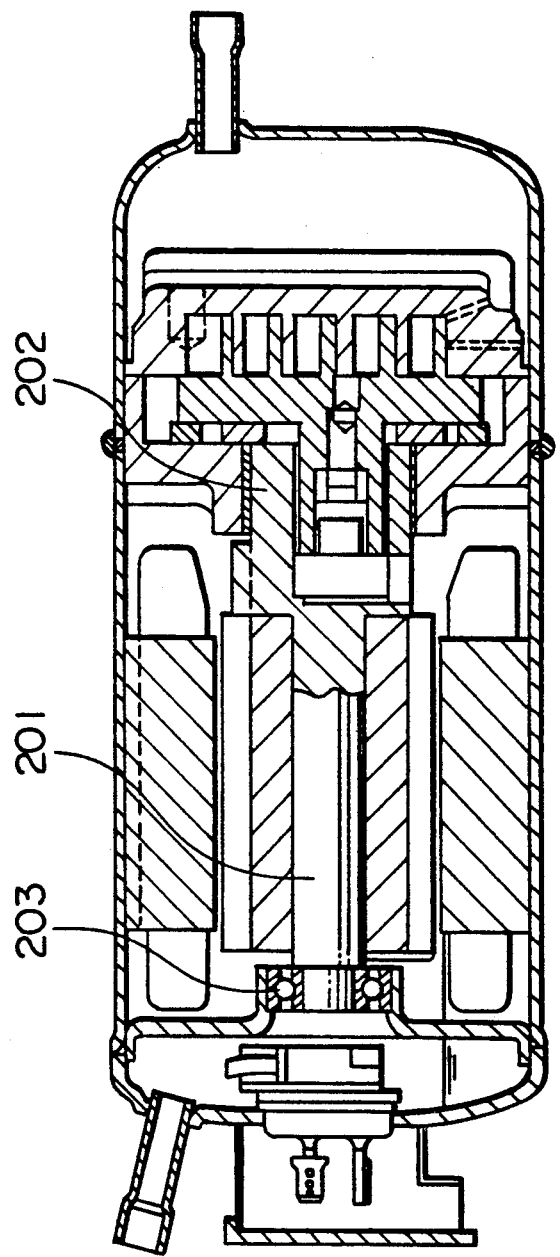

A scroll compressor according to examples of the invention will be described below by referring to the drawings.

Figure 3:
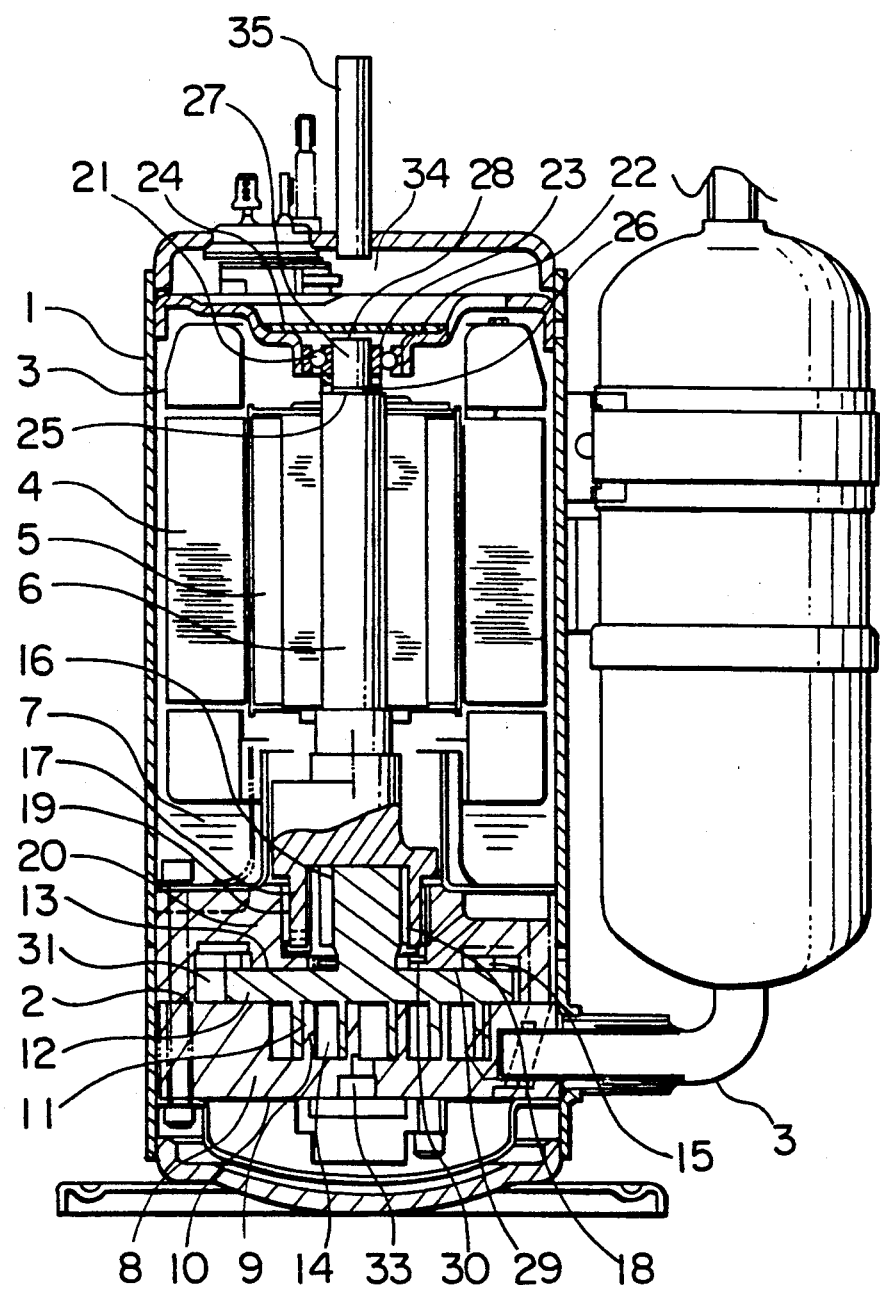
FIG. 3 is a sectional view of a scroll compressor according to the first example of the present invention.

First, referring to FIG. 3, the first example of the invention will be described below. In the drawing, within the closed container 1 is fixed a stator 4 of an electric motor 3 which drives a compression mechanism 2, and to a rotor 5 of the motor 3 is fixed a crank shaft 6 which drives the compression mechanism 2. A lower portion in the closed container 1 defines a lubricant oil sump 7. The compression mechanism 2 comprises a stationary swirl vane member 10 integrally composed of a stationary frame body 8 and stationary swirl vanes 9, a revolving swirl blade member 13 having a revolving end plate 12 integrally comprised of revolving swirl blades 11 meshing with the stationary swirl vanes 9 for defining a plurality of compression work rooms 14, and a rotation preventing member 15 preventing the rotation of the revolving swirl blade member 13 on its own axis but only allowing a revolving motion of the same. The revolving end plate 12 is formed at the side opposite to the revolving swirl blades 11 with a revolving motion drive shaft 16, which is fitted in an eccentric bearing 18 eccentrically disposed inside of the main shaft 17 which is formed at one end of the crank shaft 6. The crank shaft 6 is supported by a main bearing member 20, which accommodates a main bearing 19 for supporting the main shaft 17, and by an upper bearing member 22, which accommodates an upper rolling bearing 21 for supporting the crank shaft 6 at the end portion thereof opposite to the main shaft 17. Above the upper bearing 21, a rise preventing plate 24 for preventing the crank shaft 6 from excessively rising upward is fixed to the upper bearing member 22 and integrated therewith. The crank shaft 6 is so shaped as to have a stepped portion where the diameter of a shaft portion mounting the rotor 5 becomes stepwise greater than that of the other shaft portion fitted in the upper bearing 21. Between the stepped portion 25 and the inner race 23 of the upper bearing 21 is provided a wave-shaped washer 26, which applies a resilient force on the end surface of the inner race 23. A narrow clearance 28 is maintained between the rise preventing plate 24 and the end portion 27 of the crank shaft 6 opposite to the main shaft 17. An axial motion limiting plate 29 limiting the axial motion of the revolving swirl blade member 13 is arranged on the back side of the revolving end plate 12 with a narrow clearance therebetween. Further, an annular back pressure partitioning strip 30 is arranged in sliding contact with the back surface of the revolving end plate 12 so as to partition the room on the back side of the revolving end plate 12 into a central room where the discharge pressure is present and a peripheral room 31 where a back pressure lower than the discharge pressure is present. A refrigerant gas suctioned through the suction tube 32 of the compressor is introduced into the compression mechanism 2, compressed in the compression work room 14, and discharged from the outlet port 33 through the discharge room 34 and discharge tube 35 to the outside of the compressor.

In the above-mentioned arrangement, the resilient force of the wave-shaped washer 26 acts on the inner race 23 of the upper bearing 21 as a bias pressure in an axial direction with a reaction force supported by the stepped surface 25 of the crank shaft 6. As a result, abnormal noises from the upper bearing 21 caused by axial vibrations and resonances of the shaft system can be prevented. However, the stiffness of the bearing is increased by the bias pressure. Further, the excessive upward rising of the crank shaft 6 due to falling or during transporting of the compressor can be prevented by providing a rise preventing plate 24 against which the end portion 27 of the crank shaft 6 opposite to the main shaft 17 abuts before the crank shaft excessively rises.

Next, the second example of the invention will be described. The same members as in the first example are denoted with the same reference numerals, and the descriptions therefor are omitted.

Figure 4:
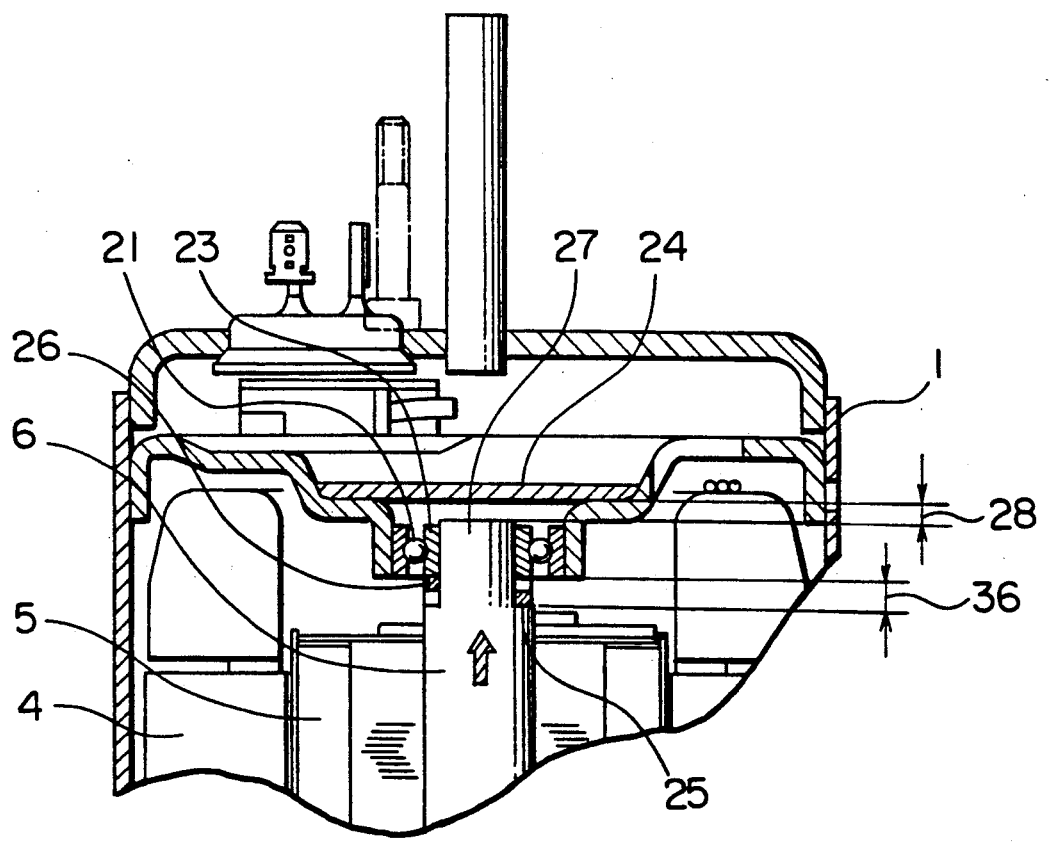
FIG. 4 is a partial sectional view of a scroll compressor according to the second example of the present invention.
Figure 5:
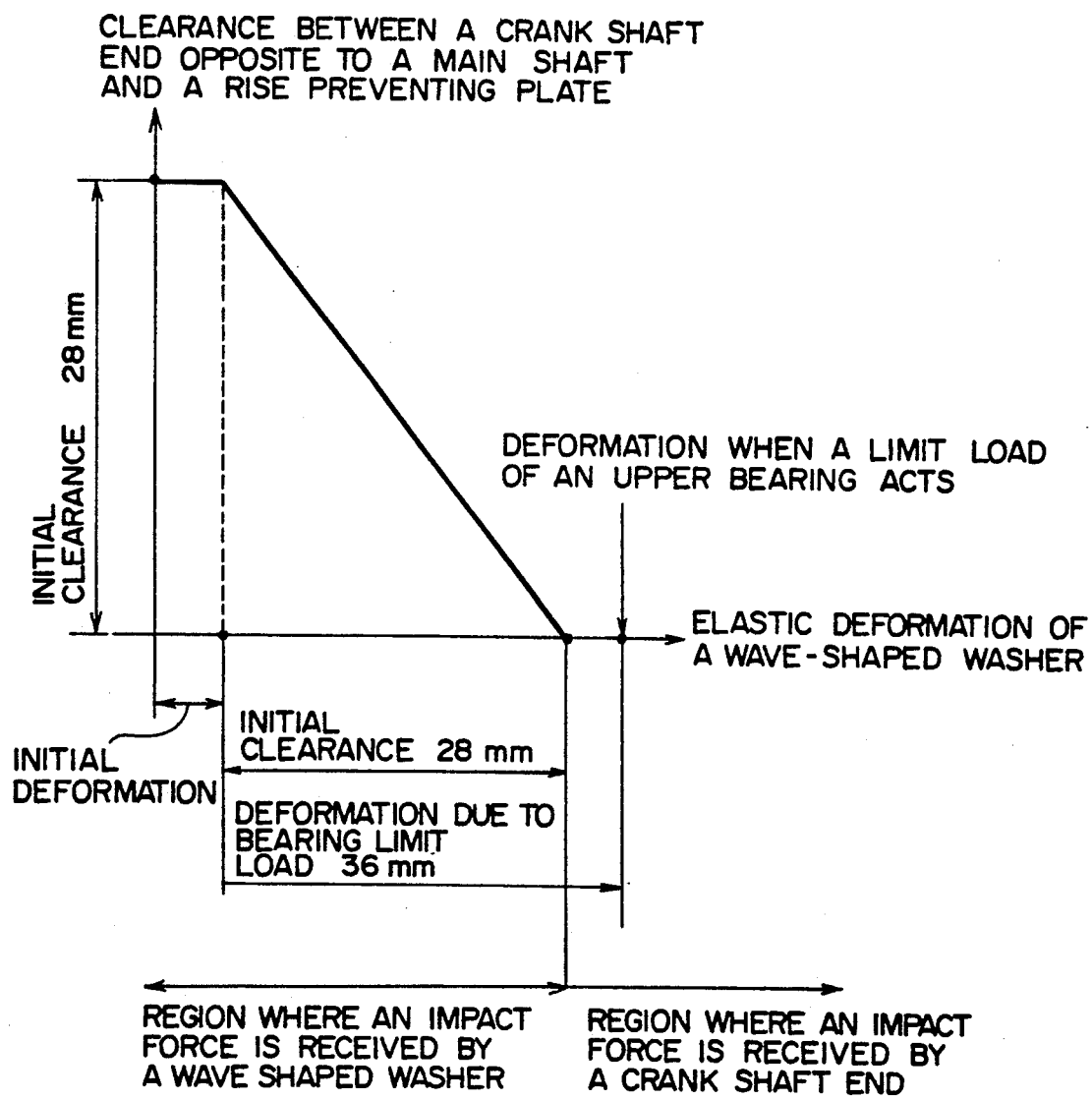
FIG. 5 shows a characteristic curve indicating a relationship between the amount of the clearance between the rise preventing plate and the end surface of the crank shaft opposite to the main shaft and the deformation amount of the elastic member (wave-formed washer).

In FIG. 4, namely, in the second example, in addition to the above-mentioned first solving means, the amount 28 of the initial clearance between the rise preventing plate 24 and the crank shaft end portion 27 opposite to the main shaft 17 is so determined as to be smaller than an elastic deformation amount 36 of the wave-shaped washer 26 assumed when the washer 36 receives a force equivalent to the limit load of the upper bearing. As understood from the FIG. 5, when an impact force due to falling or during transporting of the compressor acts on the crank shaft, the end portion 27 of the crank shaft 6 opposite to the main shaft 17 firstly moves by the distance equal to the above-mentioned clearance and abuts on the rise preventing plate 24, before the upper bearing 21 suffers a force greater than the limit load thereof. Therefore, there is no fear that an impact force greater than the limit load acts on the upper bearing 21. As a result, the upper bearing is protected in a more complete manner in comparison with in the first example. In the both examples mentioned above, a wave-shaped washer is used as an elastic member, the elastic member is not limited thereto, but will do if the member has an elastic limit greater than the limit load of the upper bearing 21. Further, although the crank shaft is arranged in a vertical position in the both examples, the same effect can be obtained even if the crank shaft is arranged in a horizontal position, in other words, in case of a horizontally situated compressor.

INDUSTRIAL APPLICABILITY

As clear from the above-mentioned embodiments according to the present invention, since an elastic force of the elastic member supported by the stepped surface of the crank shaft acts on the inner race of the upper bearing as a bias force in an axial direction, abnormal noises generated from the upper bearing due to axial vibrations or resonances of the shaft system can be prevented. Further, an excessive rising of the crank shaft due to falling or during transporting of the compressor is prevented by providing a rise preventing plate on which the end portion of the crank shaft opposite to the main shaft abuts. In addition, since the amount of the initial clearance between the rise preventing plate and the crank shaft end portion opposite to the main shaft is so determined as to be smaller than an elastic deformation amount of the elastic member assumed when a force quivalent to the limit load of the upper bearing acts thereon, when an impact force due to falling or during transporting of the compressor acts on the crank shaft, the end portion of the crank shaft opposite to the main shaft firstly moves by the distance equivalent to the above-mentioned clearance and abuts on the rise preventing plate, before the upper bearing suffers a force greater than the limit load thereof. As a result, the upper bearing is protected in a more complete manner. By virtue of the above-mentioned effects, there can be provided a scroll compressor having superior features with respect to vibration and noise and an improved reliability.

We claim:

1. A scroll compressor comprising:
   a closed container;
   an electric motor disposed in an upper portion of an interior region of said container and comprising a rotor and a stator;
   a crank shaft supporting said rotor and comprising a first end defining a main shaft, a second end, a main bearing supporting said main shaft and a rolling type upper bearing supporting said second end and comprising an inner race and an outer race;
   an eccentric bearing eccentrically disposed inside said main shaft; and
   a compression mechanism disposed in a lower portion of the interior region of said container and driven by said electric motor through said crank shaft,
   said compression mechanism comprising:
   a stationary swirl vane member including a stationary frame body formed with stationary swirl vanes thereon,
   a revolving swirl blade member including a revolving end plate having a first side formed with revolving swirl blades thereon and a second side opposite to said first side, said revolving swirl blades meshing with said stationary swirl vanes for defining a plurality of compression work rooms,
   a rotation preventing member for preventing rotation of the revolving swirl blade member on its own axis but still allowing a revolving motion of said revolving swirl blade member,
   a revolving motion drive shaft for revolving said revolving swirl blade member, said revolving motion drive shaft being formed on said second side and fitted in said eccentric bearing, and
   a rise preventing plate, provided above said upper bearing, for preventing the crank shaft from excessively rising upwards,
   said crank shaft further comprising a stepped portion wherein a diameter of a shaft portion at which said rotor is supported is stepwise greater than a diameter of said second end that is supported in said upper bearing, and an elastic member provided between said stepped portion and the inner race of said upper bearing, wherein a narrow clearance is provided between said rise preventing plate and said second end portion of said crank shaft.

2. A scroll compressor as claimed in claim 1, wherein said narrow clearance between said rise preventing plate and said second end portion of the crank shaft is smaller than an elastic deformation amount resulting when said elastic member is acted on by a force equivalent to a limit load of said upper bearing.

* * * * *